(12) United States Patent
Miura et al.

(10) Patent No.: US 9,717,989 B2
(45) Date of Patent: Aug. 1, 2017

(54) ADDING TRIGGERS TO CLOUD-BASED EMULATED GAMES (71) Applicant: Sony Computer Entertainment Inc., Tokyo (JP)

(72) Inventors: Victor Octav Suba Miura, Foster City, CA (US); Brian Michael Christopher Watson, Burlingame, CA (US); Jacob P. Stine, East Palo Alto, CA (US); Nicholas J. Cardell, Foster City, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 13/790,311

(22) Filed: Mar. 8, 2013

(65) Prior Publication Data

US 2014/0004956 A1 Jan. 2, 2014

Related U.S. Application Data (60) Provisional application No. 61/666,628, filed on Jun. 29, 2012.

(51) Int. Cl.
*A63F 13/00* (2014.01)
*A63F 13/42* (2014.01)
(Continued)

(52) U.S. Cl.
CPC .............. *A63F 13/42* (2014.09); *A63F 13/06* (2013.01); *A63F 13/10* (2013.01); *A63F 13/60* (2014.09);
(Continued)

(58) Field of Classification Search
CPC .......... A63F 13/00; A63F 13/02; A63F 13/06; A63F 13/10; A63F 13/1037; A63F 13/6009; A63F 13/6045
(Continued)

(56) References Cited

U.S. PATENT DOCUMENTS 6,009,458 A * 12/1999 Hawkins et al. ............. 709/203
6,280,323 B1   8/2001 Yamazaki et al.
(Continued)

FOREIGN PATENT DOCUMENTS

CN     1192013 A    9/1998
CN   101346162 B    3/2012
(Continued)

OTHER PUBLICATIONS

U.S. Appl. No. 13/631,725, entitled "Replay and Resumption of Suspended Game" to Brian Michael Christopher Watson et al., filed Sep. 28, 2012.
(Continued)

*Primary Examiner* — David L Lewis
*Assistant Examiner* — Ross Williams
(74) *Attorney, Agent, or Firm* — JDI Patent; Joshua D. Isenberg; Robert A. Pullman (57) ABSTRACT Embodiments of the present invention describe the addition of a haptic response to legacy games that were not originally programed to support haptics. The haptic capabilities may be added to the legacy game while it is being emulated by an emulator. The emulator is designed to generate a haptic stimulus that may be sent to the client device platform when a haptic trigger is present in the legacy game. The client device platform may then use the haptic stimulus to generate a haptic response. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

17 Claims, 6 Drawing Sheets

(51) Int. Cl.
*A63F 13/60* (2014.01)
*A63F 13/20* (2014.01)
*A63F 13/40* (2014.01)

(52) U.S. Cl.
CPC ........... *A63F 2300/1037* (2013.01); *A63F 2300/6009* (2013.01); *A63F 2300/6045* (2013.01)

(58) Field of Classification Search
USPC .............................. 463/1–6, 30–33, 40–42
See application file for complete search history.

(56) References Cited

U.S. PATENT DOCUMENTS

| | | |
|---|---|---|
| 6,402,620 B1 | 6/2002 | Naghi |
| 7,159,008 B1 | 1/2007 | Wies et al. |
| 7,286,132 B2 | 10/2007 | Kuhne |
| 7,470,196 B1 | 12/2008 | Joshi |
| 7,493,365 B2* | 2/2009 | Wies et al. ............... 709/204 |
| 7,841,946 B2 | 11/2010 | Walker et al. |
| 8,267,796 B2 | 9/2012 | Iwakiri |
| 8,321,571 B2 | 11/2012 | Crowder, Jr. et al. |
| 8,661,496 B2 | 2/2014 | Perlman et al. |
| 8,935,487 B2 | 1/2015 | Sengupta et al. |
| 9,248,374 B2 | 2/2016 | Watson et al. |
| 9,258,012 B2 | 2/2016 | Miura |
| 2002/0002510 A1* | 1/2002 | Sharp et al. ............. 705/26 |
| 2002/0045484 A1* | 4/2002 | Eck et al. ................ 463/42 |
| 2002/0065915 A1* | 5/2002 | Anderson et al. ........ 709/225 |
| 2003/0037030 A1 | 2/2003 | Dutta et al. |
| 2003/0190950 A1 | 10/2003 | Matsumoto |
| 2003/0225560 A1 | 12/2003 | Garcia et al. |
| 2004/0179019 A1 | 9/2004 | Sabella et al. |
| 2004/0224772 A1 | 11/2004 | Canessa et al. |
| 2004/0266529 A1 | 12/2004 | Chatani |
| 2005/0195187 A1 | 9/2005 | Seiler et al. |
| 2005/0288954 A1 | 12/2005 | McCarthy et al. |
| 2006/0009290 A1 | 1/2006 | Taho et al. |
| 2006/0080702 A1 | 4/2006 | Diez et al. |
| 2006/0117260 A1 | 6/2006 | Sloo et al. |
| 2006/0146057 A1 | 7/2006 | Blythe |
| 2006/0160626 A1 | 7/2006 | Gatto et al. |
| 2006/0259292 A1 | 11/2006 | Solomon et al. |
| 2007/0060361 A1 | 3/2007 | Nguyen et al. |
| 2007/0298866 A1 | 12/2007 | Gaudiano et al. |
| 2008/0032794 A1 | 2/2008 | Ware et al. |
| 2008/0113749 A1 | 5/2008 | Williams et al. |
| 2008/0282241 A1* | 11/2008 | Dong ........................ 718/1 |
| 2008/0300053 A1 | 12/2008 | Muller |
| 2009/0082102 A1 | 3/2009 | Sargaison et al. |
| 2009/0088236 A1 | 4/2009 | Laude et al. |
| 2009/0098943 A1 | 4/2009 | Weber et al. |
| 2009/0162029 A1 | 6/2009 | Glen |
| 2009/0282139 A1 | 11/2009 | Mejdrich et al. |
| 2009/0303245 A1 | 12/2009 | Soupikov et al. |
| 2010/0088296 A1 | 4/2010 | Periyagaram et al. |
| 2010/0250650 A1 | 9/2010 | Allen |
| 2010/0259536 A1 | 10/2010 | Toksvig et al. |
| 2011/0013699 A1 | 1/2011 | Persson et al. |
| 2011/0098111 A1 | 4/2011 | Saito et al. |
| 2011/0218037 A1 | 9/2011 | Singh |
| 2011/0299105 A1 | 12/2011 | Morrison et al. |
| 2012/0021840 A1 | 1/2012 | Johnson et al. |
| 2012/0052930 A1 | 3/2012 | Mcgucken |
| 2012/0142425 A1 | 6/2012 | Scott et al. |
| 2012/0299940 A1 | 11/2012 | Dietrich, Jr. et al. |
| 2013/0137518 A1 | 5/2013 | Lucas |
| 2014/0004941 A1 | 1/2014 | Christopher Watson et al. |
| 2014/0004949 A1 | 1/2014 | Miura et al. |
| 2014/0004957 A1 | 1/2014 | Stine et al. |
| 2014/0004962 A1 | 1/2014 | Miura et al. |
| 2014/0066177 A1 | 3/2014 | Zalewski |
| 2014/0092087 A1 | 4/2014 | Kazama et al. |
| 2014/0094299 A1 | 4/2014 | Stine et al. |
| 2014/0094313 A1 | 4/2014 | Watson et al. |
| 2014/0094314 A1 | 4/2014 | Watson et al. |
| 2014/0094315 A1 | 4/2014 | Stine et al. |

FOREIGN PATENT DOCUMENTS

| | | |
|---|---|---|
| CN | 101889442 B | 10/2014 |
| EP | 1172132 A | 1/2002 |
| EP | 1225767 A | 7/2002 |
| EP | 2039404 A2 | 3/2009 |
| EP | 2040163 A1 | 3/2009 |
| JP | 2009072601 A | 4/2009 |
| JP | 2012034793 A | 2/2012 |
| RU | 2364938 C2 | 8/2009 |
| WO | 2004024259 A | 3/2004 |
| WO | 2014052205 A1 | 4/2014 |

OTHER PUBLICATIONS

U.S. Appl. No. 13/631,740, entitled "Method for Creating a Mini-Game" to Brian Michael Christopher Watson et al., filed Sep. 28, 2012.

U.S. Appl. No. 13/631,785, entitled "Pre-Loading Translated Code in Cloud Based Emulated Applications" to Jacob P. Stine et al., filed Sep. 28, 2012.

U.S. Appl. No. 13/631,803, entitled "Adaptive Load Balancing in Software Emulation of GPU Hardware", to Takayuki Kazama and Victor Octav Suba Miura, filed Sep. 28, 2012.

U.S. Appl. No. 13/631,812, entitled "Method and Apparatus for Improving Efficiency Wihout Increasing Latency in Emulation of a Legacy Application Title" to Jacob P. Stine et al., filed Sep. 28, 2012.

U.S. Appl. No. 13/790,320, entitled "Determining Triggers for Cloud-Based Emulated Games" to Victor Octav Suba Miura et al., filed Mar. 8, 2013.

U.S. Appl. No. 13/791,379, entitled "Suspending State of Cloud-Based Legacy Application" to Jacob P. Stine et al., filed Mar. 8, 2013.

U.S. Appl. No. 13/791,420, entitled "Conversion of Haptic Events Into Screen Events" to Brian Michael Christopher Watson and Victor Octav Suba Miura, filed Mar. 8, 2013.

U.S. Appl. No. 13/791,434, entitled "Haptic Enhancements for Emulated Video Game Not Originally Designed With Haptic Capabilities" to Victor Octav Suba Miura and Brian Michael Christopher Watson, filed Mar. 8, 2013.

U.S. Appl. No. 61/666,665 to Brian Michael Christopher Watson et al., filed Jun. 29, 2012.

U.S. Appl. No. 61/666,628 to Victor Octav Suba Miura et al., filed Jun. 29, 2012.

U.S. Appl. No. 61/666,645 to Victor Octav Suba Miura et al., filed Jun. 29, 2012.

U.S. Appl. No. 61/666,679 to Jacob P. Stine et al., filed Jun. 29, 2012.

Non-Final Office Action for U.S. Appl. No. 13/631,812, dated Mar. 28, 2014.

Non-Final Office Action for U.S. Appl. No. 13/791,379, dated Mar. 27, 2014.

PCT International Search Report and Written Opinion for International Application No. PCT/US2013/061023, dated Jan. 23, 2014.

PCT International Search Report and Written Opinion for International Application No. PCT/US2013/061029, dated Jan. 23, 2014.

Non-Final Office Action for U.S. Appl. No. 13/791,420, dated Mar. 27, 2014.

Co-Pending U.S. Appl. No. 61/694,718, to Gary M. Zalewski, filed Aug. 29, 2012.

Co-Pending U.S. Appl. No. 61/794,811, to Victor Octav Suba Miura, filed Mar. 15, 2013.

Final Office Action for U.S. Appl. No. 13/791,420, dated Jun. 11, 2014.

International Search Report and Written Opinion for International Application No. PCT/US2013/074813, dated May 29, 2014.

Non-Final Office Action for U.S. Appl. No. 13/790,320, dated Jun. 18, 2014.

(56) References Cited

OTHER PUBLICATIONS

Non-Final Office Action for U.S. Appl. No. 13/792,664, dated Jun. 23, 2014.
Final Office Action for U.S. Appl. No. 13/631,725, dated Dec. 19, 2014.
Final Office Action for U.S. Appl. No. 13/790,320, dated Jan. 15, 2015.
Non-Final Office Action for U.S. Appl. No. 13/791,434, dated Nov. 26, 2014.
Final Office Action for U.S. Appl. No. 13/631,812, dated Aug. 29, 2014.
Non-Final Office Action for U.S. Appl. No. 13/631,725, dated Sep. 12, 2014.
Non-Final Office Action for U.S. Appl. No. 13/631,785, dated Oct. 22, 2014.
Non-Final Office Action for U.S. Appl. No. 13/631,803, dated Oct. 14, 2014.
Non-Final Office Action for U.S. Appl. No. 13/791,379, dated Oct. 16, 2014.
Non-Final Office Action for U.S. Appl. No. 13/631,740, dated Oct. 21, 2014.
Final Office Action for U.S. Appl. No. 13/631,740, dated Jul. 27, 2015.
Final Office Action for U.S. Appl. No. 13/791,434, dated Jun. 23, 2015.
Non-Final Office Action for U.S. Appl. No. 13/631,785, dated May 21, 2015.
Non-Final Office Action for U.S. Appl. No. 13/790,320, dated Jul. 28, 2015.
Final Office Action for U.S. Appl. No. 13/631,803, dated Apr. 16, 2015.
Grand Theft Auto: San Andreas Guide—Territories, https://www.youtube.com/watch?v=5d2GY-gr, May 29, 2012.
GTA San Andreas How to start a gang war, https://www.youtube.com/watch?v=9N4908kGtLO, Jan. 13, 2013.
Non-Final Office Action for U.S. Appl. No. 13/631,725, dated Mar. 16, 2015.
Non-Final Office Action for U.S. Appl. No. 13/631,740, dated Feb. 27, 2015.
Non-Final Office Action for U.S. Appl. No. 13/791,420, dated Apr. 9, 2015.
Non-Final Office Action for U.S. Appl. No. 14/183,351, dated May 11, 2015.
Playstation2, 2004, Grand Theft Auto—San Andreas.
Non-Final Office Action for U.S. Appl. No. 14/183,351, dated May 12, 2015.
Final Office Action for U.S. Appl. No. 13/791,379, dated May 13, 2015.
Final Office Action for U.S. Appl. No. 13/791,434, dated Feb. 17, 2016.
Final Office Action for U.S. Appl. No. 13/631,803, dated Feb. 1, 2016.
Final Office Action for U.S. Appl. No. 13/790,320, dated Feb. 10, 2016.
Japanese Office Action for JP Application No. 2015-517495, dated Feb. 9, 2016.
Notice of Allowance for U.S. Appl. No. 14/183,351, dated Oct. 5, 2015.
Final Office Action for U.S. Appl. No. 13/631,785, dated Dec. 4, 2015.
Final Office Action for U.S. Appl. No. 13/791,420, dated Oct. 9, 2015.
Non-Final Office Action for U.S. Appl. No. 13/631,803, dated Sep. 17, 2015.
Notice of Allowance for U.S. Appl. No. 13/631,725, dated Oct. 6, 2015.
European Search Report and Written Opinion for EP Application No. 13841130.1, dated Oct. 4, 2016.
Non-Final Office Action for U.S. Appl. No. 13/631,785, dated Nov. 3, 2016.
Non-Final Office Action for U.S. Appl. No. 13/631,812, dated Jan. 18, 2017.
Non-Final Office Action for U.S. Appl. No. 15/225,361, dated Oct. 21, 2016.
Notice of Allowance for U.S. Appl. No. 13/790,320, dated Dec. 5, 2016.
Notice of Allowance for U.S. Appl. No. 15/019,891, dated Jan. 26, 2017.
Non-Final Office Action for U.S. Appl. No. 13/631,812, dated Jun. 3, 2016.
Non-Final Office Action for U.S. Appl. No. 13/791,379, dated Jul. 1, 2016.
Non-Final Office Action for U.S. Appl. No. 15/019,891, dated May 6, 2016.
European Search Report and Written Opinion for European Application No. PCT/US2013/047856, dated Jul. 28, 2016.
U.S. Appl. No. 61/666,628, to Victor Octav Suba Miura, filed Jun. 29, 2012.
U.S. Appl. No. 61/666,645, to Victor Octav Suba Miura, filed Jun. 29, 2012.
U.S. Appl. No. 61/666,665, to Brian Michael Christopher Watson, filed Jun. 29, 2012.
U.S. Appl. No. 61/666,679, to Jacob P. Stine, filed Jun. 29, 2012.
Chinese Office Action for CN Application No. 201380045408.4, dated Sep. 20, 2016.
Final Office Action for U.S. Appl. No. 15/019,891, dated Oct. 19, 2016.
Non-Final Office Action for U.S. Appl. No. 13/631,740, dated Sep. 30, 2016.
Non-Final Office Action for U.S. Appl. No. 151225,361, dated Oct. 21, 2016.
Notice of Allowance for U.S. Appl. No. 13/631,740, dated Mar. 16, 2017.
Notice of Allowance for U.S. Appl. No. 13/631,785, dated Feb. 27, 2017.

* cited by examiner

ADDING TRIGGERS TO CLOUD-BASED EMULATED GAMES

CLAIM OF PRIORITY

This application is a nonprovisional of commonly-assigned U.S. Provisional Patent Application No. 61/666,628 filed Jun. 29, 2012, the entire disclosures of which are incorporated herein by reference.

CROSS-REFERENCE TO RELATED APPLICATION

This application is related to commonly-assigned, co-pending provisional application Ser. No. 61/666,645, entitled "HAPTIC ENHANCEMENTS FOR EMULATED VIDEO GAME NOT ORIGINALLY DESIGNED WITH HAPTIC CAPABILITIES" to Victor Octav Suba Miura and Brian Michael Christopher Watson, filed Jun. 29, 2012, the entire disclosures of which are incorporated herein by reference.

This application is related to commonly-assigned, co-pending provisional application Ser. No. 61/666,665, entitled "CONVERSION OF HAPTIC EVENTS INTO SCREEN EVENTS" to Brian Michael Christopher Watson and Victor Octav Suba Miura filed Jun. 29, 2012, and, the entire disclosures of which are incorporated herein by reference.

This application is related to commonly-assigned, co-pending provisional application Ser. No. 61/666,679, entitled "SUSPENDING STATE OF CLOUD-BASED LEGACY APPLICATION" to Jacob P. Stine et al., filed Jun. 29, 2012, the entire disclosures of which are incorporated herein by reference.

FIELD OF THE DISCLOSURE

The present disclosure is related to video game emulation. Among other things, this application describes a method and apparatus for emulating a video game that includes identifying triggers that can be used for incorporating new content into the emulated video games.

BACKGROUND OF THE DISCLOSURE

Finding new ways to play preexisting video games can increase the longevity of older games. Instead of replaying the same level or completing the same missions repeatedly, gamers often desire new challenges when replaying legacy games. In response to this need, trigger generators have begun to produce mini-games. Within a mini-game, the gamer can be instructed to complete new objectives or challenge their friends for high scores in a format that was not originally designed into the legacy game. Further, since the mini-game is derived from a legacy game, the gamer already knows the characters and basic components of the game, and is therefore more likely to play the mini-game.

However, in order to generate these mini-games trigger generators must reverse engineer the underlying code in each game and then rewrite the code to enable the new features. This process is time consuming and expensive, because it may require multiple engineers to redevelop a single legacy game. Additionally since mini-games are shorter than full-length games, there is a need to produce mini-games in larger quantities.

It is within this context that aspects of the present disclosure arise.

DETAILED DESCRIPTION OF THE DRAWINGS

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

In order to create mini-games without reverse engineering and recoding a game designer may rely on the use of triggers and snapshots to provide information needed for the mini-games without having to dig into the code of the legacy game. Snapshots are further described in commonly assigned co-pending application Ser. No. 61/666,679 filed Jun. 29, 2012, and entitled "SUSPENDING STATE OF CLOUD-BASED LEGACY APPLICATIONS". The mini-games may be made by providing an emulator with game inputs that bring the emulated game to a certain point where the mini-game will begin. A snapshot may be taken at that point in order to be used as the starting point in the future mini-game. Thereafter, triggers may be generated according to aspects of the present disclosure in order to provide new experiences for the game. Game designers may then develop a script and combine it with the snapshot and triggers to produce the mini-game. Therefore, in order to design mini-games in this manner, there is a need in the art for a method of quickly identifying triggers.

According to an aspect of the present disclosure, a trigger event that requires an emulator to produce a desired output is identified. A trigger that is associated with the trigger event is then identified and stored in a memory of the emulator. Thereafter, when the emulator runs an emulation routine, it will compare the emulated game data to the trigger stored in its memory, and will therefore know to produce the desired output when the emulated game data matches the trigger.

Figure 1:
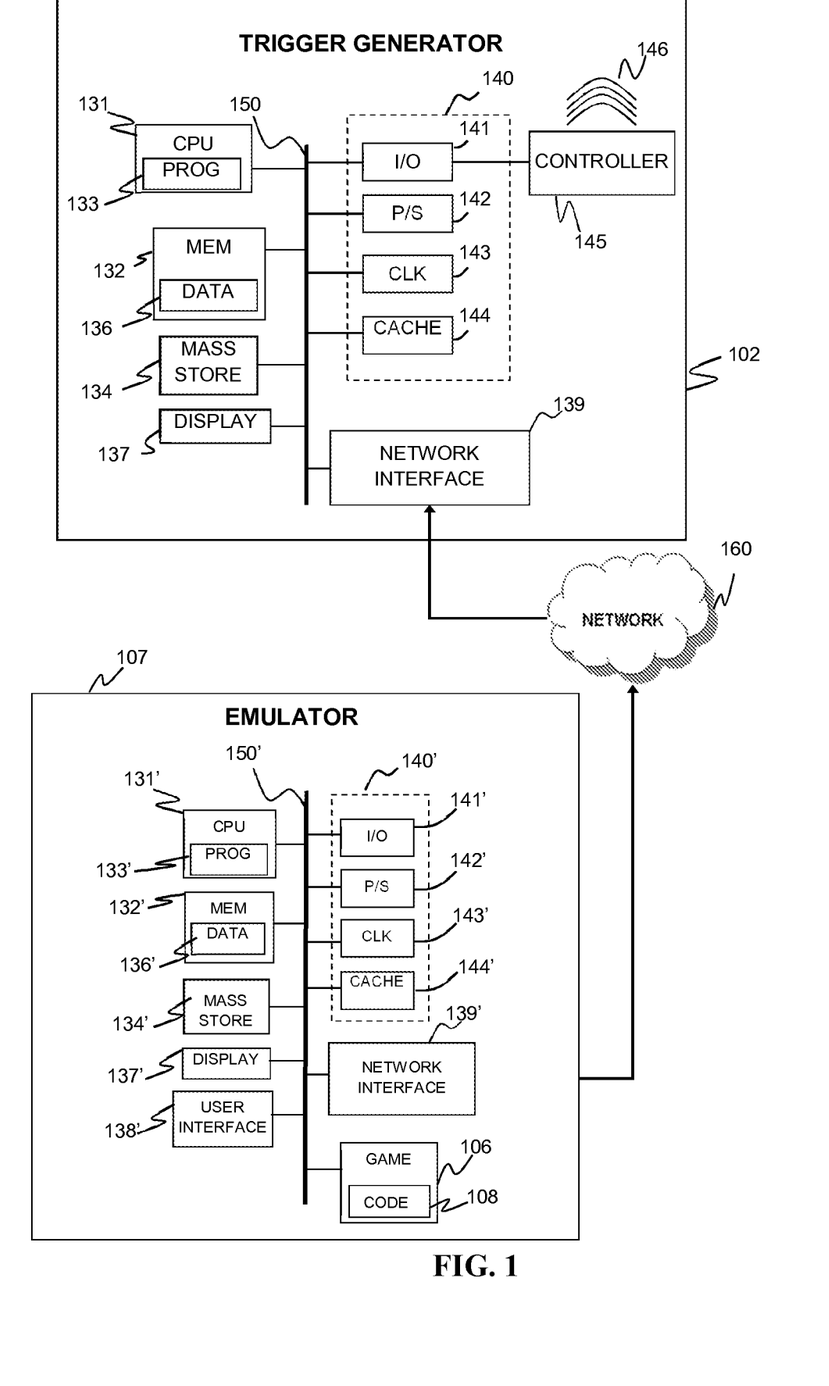
FIG. 1 is a schematic diagram of a trigger generator and an emulator communicating over a network according to an aspect of the present disclosure.

FIG. 1A is a schematic of an embodiment of the present invention. Emulator 107 may be accessed by a trigger generator 102 over a network 160. Trigger generator 102 may access alternative emulators 107 over the network 160. Emulators 107 may be identical to each other, or they may each be programed to emulate unique legacy game titles 106 or unique sets of legacy game titles 106. Additionally, the trigger generator 102 may be contained within the emulator 107 and may communicate directly with the emulator over an internal system bus 150'

Trigger generator 102 may include a central processor unit (CPU) 131. By way of example, a CPU 131 may include one or more processors, which may be configured according to, e.g., a dual-core, quad-core, multi-core, or Cell processor architecture. The client device platform 103 may also include a memory 132 (e.g., RAM, DRAM, ROM, and the like). The CPU 131 may execute a process-control program 133, portions of which may be stored in the memory 132. The client trigger generator 102 may also include well-known support circuits 140, such as input/output (I/O) circuits 141, power supplies (P/S) 142, a clock (CLK) 143 and cache 144. The client trigger generator 102 may optionally include a mass storage device 134 such as a disk drive, CD-ROM drive, tape drive, or the like to store programs and/or data. The trigger generator 102 may also optionally include a display unit 137. The display unit 137 may be in the form of a cathode ray tube (CRT) or flat panel screen that displays text, numerals, or graphical symbols. A controller 145 may be connected to the trigger generator 102 through the I/O circuit 141 or it may be directly integrated into the trigger generator 102. The controller 145 may facilitate interaction between the trigger generator 102 and a user. The controller 145 may include a keyboard, mouse, joystick, light pen, hand-held controls or other device. The controller 145 is also may be capable of generating a haptic response 146. By way of example and not by way of limitation, the haptic response 146 may be vibrations or any other feedback corresponding to the sense of touch. The trigger generator 102 may include a network interface 139, configured to enable the use of Wi-Fi, an Ethernet port, or other communication methods.

The network interface 139 may incorporate suitable hardware, software, firmware or some combination of two or more of these to facilitate communication via an electronic communications network 160. The network interface 139 may be configured to implement wired or wireless communication over local area networks and wide area networks such as the Internet. The trigger generator 102 may send and receive data and/or requests for files via one or more data packets over the network 160.

The preceding components may exchange signals with each other via an internal system bus 150. The trigger generator 102 may be a general purpose computer that becomes a special purpose computer when running code that implements embodiments of the present invention as described herein.

The emulator 107 may include a central processor unit (CPU) 131'. By way of example, a CPU 131' may include one or more processors, which may be configured according to, e.g., a dual-core, quad-core, multi-core, or Cell processor architecture. The emulator 107 may also include a memory 132' (e.g., RAM, DRAM, ROM, and the like). The CPU 131' may execute a process-control program 133', portions of which may be stored in the memory 132'. The emulator 107 may also include well-known support circuits 140', such as input/output (I/O) circuits 141', power supplies (P/S) 142', a clock (CLK) 143' and cache 144'. The emulator 107 may optionally include a mass storage device 134' such as a disk drive, CD-ROM drive, tape drive, or the like to store programs and/or data. The emulator 107 may also optionally include a display unit 137' and user interface unit 138' to facilitate interaction between the emulator 107 and a user who requires direct access to the emulator 107. By way of example and not by way of limitation a trigger generator 102 or engineer may need direct access to the emulator 107 in order to program the emulator 107 to properly emulate a desired legacy game 106 or to add additional mini-game capabilities to a legacy game 106. The display unit 137' may be in the form of a cathode ray tube (CRT) or flat panel screen that displays text, numerals, or graphical symbols. The user interface unit 138' may include a keyboard, mouse, joystick, light pen, or other device. The emulator 107 may include a network interface 139', configured to enable the use of Wi-Fi, an Ethernet port, or other communication methods.

The network interface 139' may incorporate suitable hardware, software, firmware or some combination of two or more of these to facilitate communication via the electronic communications network 160. The network interface 139' may be configured to implement wired or wireless communication over local area networks and wide area networks such as the Internet. The emulator 107 may send and receive data and/or requests for files via one or more data packets over the network 160.

The preceding components may exchange signals with each other via an internal system bus 150'. The emulator 107 may be a general purpose computer that becomes a special purpose computer when running code that implements embodiments of the present invention as described herein.

Emulator 107 may access a legacy game 106 that has been selected by the client device platform 103 for emulation through the internal system bus 150'. There may be more than one legacy game 106 stored in the emulator. The legacy games may also be stored in the memory 132' or in the mass storage device 134'. Additionally, one or more legacy games 106 may be stored at a remote location accessible to the emulator 107 over the network 160. Each legacy game 106 contains game code 108. When the legacy game 106 is emulated, the game code 108 produces legacy game data 109.

By way of example, a legacy game 106 may be any game that is not compatible with a target platform. By way of example and not by way of limitation, the legacy game 106 may have been designed to be played on Sony Computer Entertainment's PlayStation console, but the target platform is a home computer. By way of example, the legacy game 106 may have been designed to be played on a PlayStation 2 console, but the target platform is a PlayStation 3 console. Further, by way of example and not by way of limitation, a legacy game 106 may have been designed to be played on a PlayStation console, but the target platform is a hand held console such as the PlayStation Vita from Sony Computer Entertainment.

Figure 2:
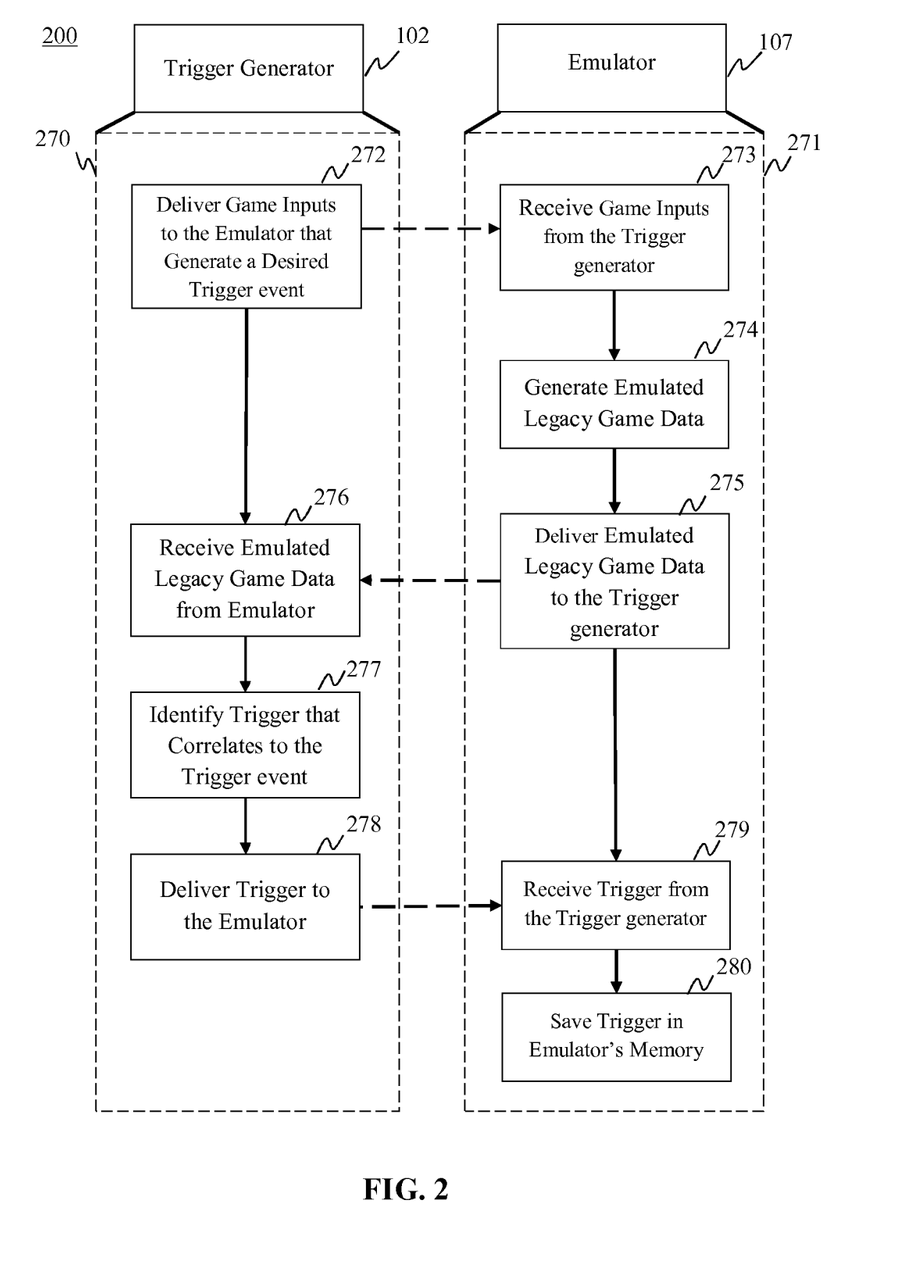
FIG. 2 is a flow diagram illustrating a method of adding a trigger to an emulated game according to an aspect of the present disclosure.

As shown in FIG. 2, the emulator 107 may be configured to implement a method for storing a trigger 351 from a legacy game 106 according to an inventive method 200. Various aspects of the method 200 may be implemented by execution of computer executable instructions running on the trigger generator 102 and/or the emulator 107 in conjunction with the actions of a trigger generator 102. Specifically, a trigger generator 102 may be configured, e.g., by suitable programming, to implement certain client device platform instructions 270. In addition, an emulator 107 may be configured to implement certain emulator instructions 271. In FIG. 2 the dashed arrows represent the flow of data between the trigger generator 102 and the emulator 107 over the network 160. Alternatively, if the trigger generator 102 is contained within the emulator 107, then the dashed arrows may represent the flow of data over the internal system bus 150'.

Initially, at 272 the trigger generator 102 may deliver game inputs 347 to the emulator 107 over the network 160. Game inputs 347 may be commands that instruct the emulator where to begin in an emulation routine, or they may be commands that control the game play of a legacy game 106 that is being emulated by the emulator 107. By way of example, and not by way of limitation, game inputs 347 may be automatically generated by the trigger generator 102, or they may be provided to the trigger generator 102 by an external source.

By way of example, and not by way of limitation, a game input 347 that instruct the emulator where to begin in an emulation routine may be in the form of a snapshot. A snapshot is a recorded state of an emulated legacy game 106, where the state of every device being used by the emulator 107 to emulate the legacy game 106 has been recorded. The recorded information and devices may include, but are not limited to the CPU, GPU, memory, register values, programmable Direct Memory Access (DMA) states, buffered data for DMA, audio chip state, CD-ROM state, and memory. Snapshots are described in further detail in to commonly-assigned, co-pending application Ser. No. 61/666,679, filed Jun. 29, 2012, and entitled "SUSPENDING STATE OF CLOUD-BASED LEGACY APPLICATION", the entire disclosures of which has been incorporated above by reference.

By way of example, and not by way of limitation, game inputs 347 which control the game play may include commands that are generally used by a game player to advance the legacy game 106 from a first state 301 to a second state 302. The first state 301 may be stored as a first snapshot 301', and the second state 302 may be stored as a second snapshot 302'. The game inputs 347 may be inputted by a controller 145, or they may be automatically generated by the trigger generator 102. Game inputs 347 of this nature may include, but are not limited to, inputs that cause a main character 340 in a legacy game 106 to move to a new position, swing a sword, select an item from a menu, or any other action that can take place during the game play of a legacy game 106. Additionally, while game inputs 347 advance the game play of the legacy game 106 from a first state 301 to a second state 302, there may also be one or more intermediate states generated. Each of the intermediate states may also be recorded as a snapshot.

The game inputs 347 generated by the trigger generator 102, or supplied to the trigger generator by an external source are chosen in order to produce a trigger event 350. A trigger event 350 is an event that occurs during the game play of a legacy game 106, and is an event that a game designer desires to provide additional outputs that are not generated by the legacy game's 106 original code 108. By way of example, and not by way of limitation, a trigger event 350 may be earning 10,000 points, finishing a level in less than three minutes, an explosion, killing an enemy or any other event or combination of events that may occur during the game play of a legacy game 106. If these trigger events 350 occur, then one or more additional outputs such as, but not limited to, the generation of a trophy for the user, generation of a haptic response 146 in a controller 145, updating a leader board, or any other output that enhances the gameplay may be desired.

The emulator 107 receives the game inputs 347 at block 273 and then proceeds to emulate the chosen legacy game 106 at 274. During emulation, the emulator 107 may produce emulated legacy game data 109. Emulated legacy game data 109 may be in the form of one or more snapshots. By way of example, and not by way of limitation, the emulator 107 may produce a snapshot 301', 302' of the first state 301 and the second state 302, or the both the first state 301, the second state 302 and one or more intermediate states. Further, the emulated data 109 may contain only portions of a snapshot for each state 301, 302, or it may contain additional information beyond what is contained in a snapshot.

As emulated legacy game data 109 is produced, the emulator 107 may deliver the emulated data 109 back to the trigger generator 102 over the network 160 at 275. The emulated legacy game data 109 may be in multiple different forms when delivered to the trigger generator 102.

Figure 3A:
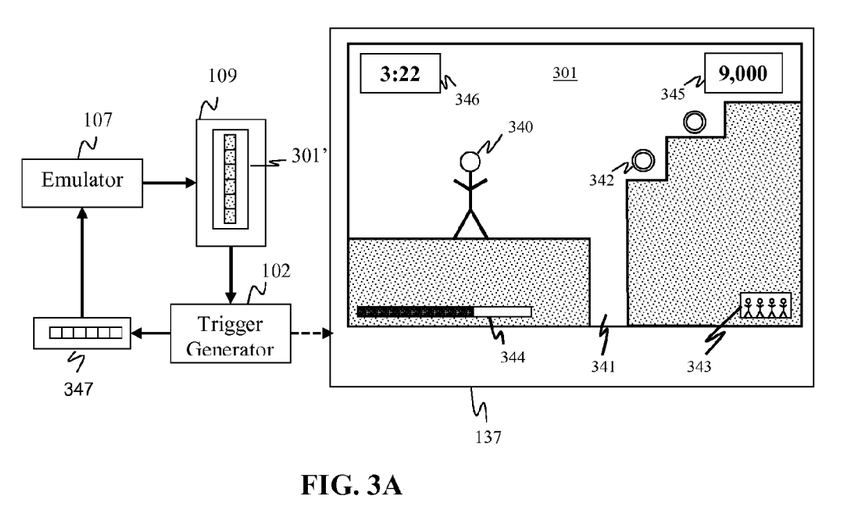
FIGS. 3A-3D are schematic diagrams of various states of an emulated legacy game and emulated game data that accompanies those states according to an aspect of the present disclosure.

By way of example, and not by limitation, the emulated data 109 may be in a form that can be displayed on the display unit 137. A screen shot of display unit 137 showing the delivered emulated data 109 may resemble the visual representation that a potential user of the legacy game 106 may see while playing the legacy game 106 on a client device platform. This visual representation may appear similar to FIG. 3A. FIG. 3A is a depiction of a first state 301 of a level in the legacy game 106. In the screen shot of the first position 301 the main character 340 is approaching a pit 341 in order to get the rings 342 on the other side. Also included in the first position 301 are areas where the score 345, the number of player lives 343 remaining, the health 344 of the main character, and the elapsed time 346 are displayed.

Also by way of example, and not by way of limitation, the emulated game data 109 may be in the form of a data printout. The data printout may provide written descriptions of every aspect of the emulation such as, but not limited to sound card events, if the emulator was reading from a disk and where on the disk the emulator was reading from, any data that was written to a memory card and the location on the card that the data was written to, whether there were any changes in a memory component of the emulator or any additional data contained in a snapshot 301', 302'.

Also by way of example, and not by way of limitation, the emulated game data 109 may be provided as a heads up display (HUD). The HUD may be overlaid on top of the visual representation displayed on the display unit 137. By way of example, and not by way of limitation, the HUD may display changes in the memory card that correspond to changes in the number of player lives 343. The HUD may then be overlaid on the region where the number of player lives 343 is displayed on the screen. Also by way of example and not by way of limitation, the HUD may be used to display changes in the memory at the location where the score 345, time 346, or any other information displayed on the display unit 137.

At 276 the trigger generator receives the emulated legacy game data 109 from the emulator. Thereafter, the trigger generator 102 may identify a trigger 351 that correlates to the trigger event 350. The trigger may be found in the emulated data 109. To identify triggers 351 the trigger generator 102 may compare the data from a first state 301 to data from a second state 302 in order to see if there are any changes in the data that directly corresponds to the trigger event. A change in the data corresponds to a trigger event 350 if the change in data always occurs when the trigger event 350 occurs. If a trigger 351 cannot be identified through the comparison of the data from a first state 301 to a second state 302, then the additional states may be generated in order to determine a trigger 351 for the trigger event 350 through the process of elimination.

Figure 3B:
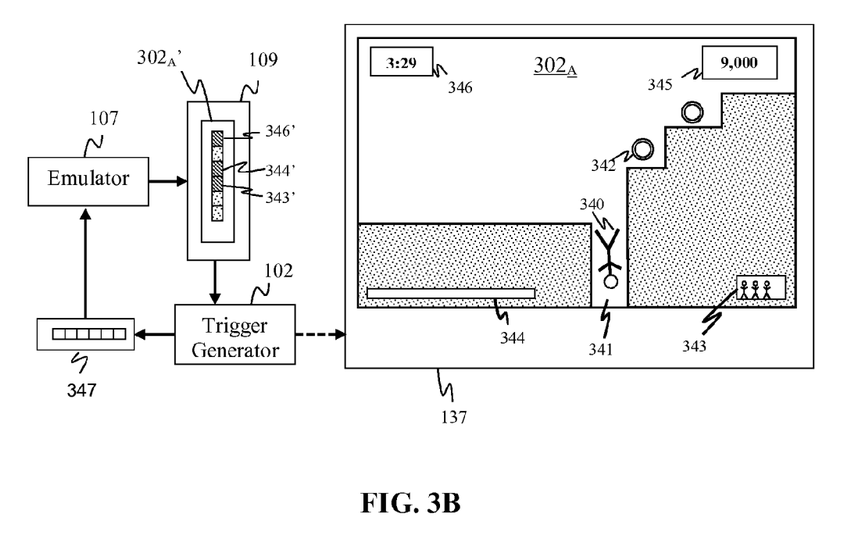
Figure 3C:
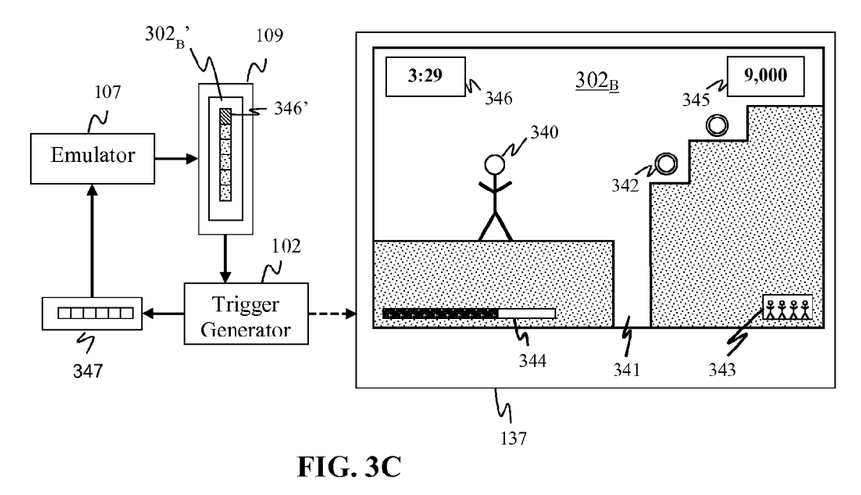
Figure 3D:
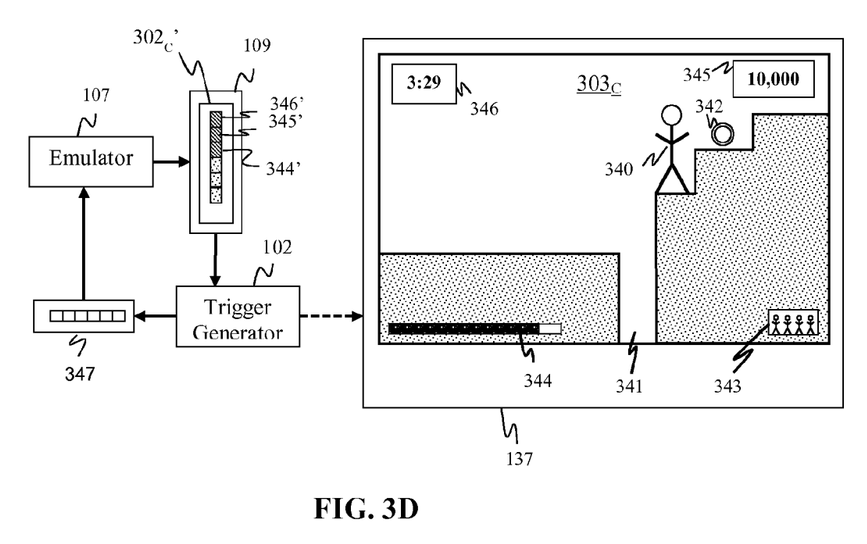

By way of example, and not by way of limitation, the trigger event 350 may be the change in the number of lives 343 of the main character 340. The trigger generator 102 may utilize a snapshot of the first position 301' in order to have a known starting location and then provide inputs 347 that cause the main character 340 to walk over the edge of the pit 341 into a second state $302_A$, as shown in FIG. 3B. By way of example, the data being sent to the trigger generator 102 at the second state $302_A$ is the snapshot for that second state $302_A'$. Additionally, the inputs 347 caused seven seconds to be added to the elapsed time 346, erased all of the main character's health 344 and resulted in the loss of a player life 343. By comparing the data from the snapshot of the first state 301' to the data from the snapshot of the second state $302_A'$, it is evident that pieces of data 346', 344', and 343' have changed. With three possible indicators of a loss of a life 343, several additional simulations may be performed to allow the trigger generator 102 to identify precisely which piece of data corresponds to the loss of a life 343. The trigger generator 102 may restart at the process by starting again from the snapshot of the first state 301' and provide no further game inputs 347. FIG. 3C shows that this process allows the elapsed time 346 to increase as shown in a second state $302_B$. Also, the snapshot for the second state $302_B'$ only displays changes at data piece 346'. Therefore, trigger generator 102 may identify that data piece 346' directly corresponds to a trigger event 350 of a change in the elapsed time 343, and as such 346' may be identified as a trigger 351 for the trigger event 350 of change in elapsed time. Next, the trigger generator 102 may again begin at the first position 301, and this time provide input data 347 that directs the main character 340 to a second position $302_C$ by jumping over the pit 341 and picking up a ring 342. As shown in FIG. 3D, picking up the ring has also caused the health 344 to increase. A comparison of the data from the snapshot of the first state 301' and the snapshot of the second state 302' shows that the pieces of data 346', 345', and 344' have been changed. As discovered from the snapshot of the second state $302_B'$, data piece 346' directly corresponds to the elapsed time 346. Data piece 344' was determined to be either a change in the number of lives 343 or a change in the health 344 by process of elimination. At the second state $302_C$, there was not a change in the number of lives 343, so therefore, data piece 344' may directly correspond with the change in the health 344. With data 344' directly corresponding to the health 344, it can also be concluded by process of elimination that data piece 343' may directly correspond to the change in lives 343. Further, since the only other change in the second state $302_C$ was an increase in the score 345, the remaining data 345' may directly correspond to the score 345. Therefore, the chosen trigger event 350 of a change in the number of lives 343 can be assigned a trigger 351 of a change in data 343'.

It should be noted that the previous example is used for illustrative purposes and there are many possible types of data that can be used as a trigger as well as methods for finding which pieces of the emulated data correlate to a given trigger event. By way of example, and not by way of limitation, instead of finding a change in a piece of data between a snapshot of a first state 301' and the snapshot of a second state 302', the trigger generator 102 may detect the generation of new pieces of data, or there may be an indication in an intermediate snapshot or other emulated data 109 that the emulator was required to read from a certain portion of a memory card. Further, the emulated data 109 may indicate that a specified event occurred on the sound card. By way of example, a trumpet may sound in the game when a player reaches 10,000 points. The playing of the trumpet, by the emulator 107 may be used as a trigger 351 for that trigger event 350.

Further, by way of example, and not by way of limitation, the comparison of emulated data 109 may be enhanced, e.g., through the use of a HUD overlay. By way of example and not by way of limitation, the HUD overlay may be used to identify a change in a memory value that corresponds to the trigger 351. For example, suppose the trigger event 350, e.g., an animation, is to be triggered on a loss of a "life" by a player. If the trigger generator 102 knows how many lives 343 a player starts with but does not know where the number of lives 343 is stored, the trigger generator 102 could use the HUD to determine which memory value changes in a manner consistent with the number of lives 343 lost as the game progresses. Once the relevant memory value is identified, a change to the memory value may be used as the trigger 351 for the trigger event 350.

Additionally, information that can be used as a trigger 351 may be generated by screen scraping the visual information displayed on the display device 137'. By way of example, screen scraping may be performed by using optical character recognition software to read the score 345 and the time 346 displayed on the screen. However, it is not always beneficial to continuously screen scrape the visual display, due to the burden on the processing power and the bandwidth of the network 160. Therefore, it is desirable to know when and where to perform the screen scraping. By way of example and not by way of limitation, the score 345 may need to be above a predetermined level in order to trigger the emulator 107 to generate the additional output of a trophy for the user. If the trigger generator 102 only knows where the data for the score 345 is stored, and not how that data correlates to the actual score 345 displayed on the screen then the screen scrape may be initiated. A change in the data where the score is stored in the memory, may be used as a trigger that initiates a screen scrape of the area of the screen where the score is displayed. Therefore, the actual value of the score is only found when there is a change in the score. Therefore, when the score changes, the screen scrape is triggered, and if the screen scrape determines that the score is above 10,000 points, then this is used as a trigger to generate a trophy to give the gamer.

According to method 200 once the trigger 351 has been identified, the trigger generator 102 will deliver the trigger 351 to the emulator 107 at 279. The emulator then receives the trigger 351 at 280. After the trigger 351 has been received, the emulator 107 will store the trigger in a memory at 281. By way of example and not by way of limitation the emulator 107 may store the trigger 351 in its memory 132' or a mass storage device 134'. Alternatively, the emulator 107 may store the trigger 351 at a remote location which it has access to over the network 160.

Figure 4A:
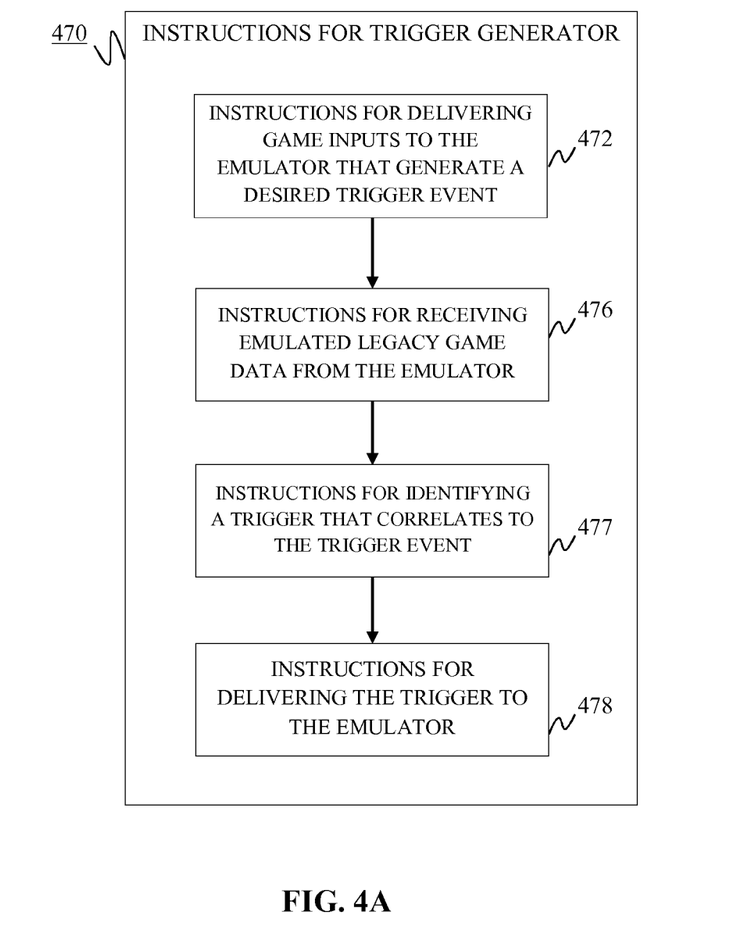
FIG. 4A is a block diagram describing the instructions for how a trigger generator is able to generate a trigger according to an aspect of the present disclosure.

As shown in FIG. 4A, a set of trigger generator instructions 470 may be implemented, e.g., by the trigger generator 102. The trigger generator instructions 470 may be formed on a nontransitory computer readable medium such as the memory 132 or the mass storage device 134. The trigger generator instructions 470 may also be part of the process control program 133. The instructions include delivering the game inputs 347 that generate a desired trigger event to the emulator 107 at 472. Thereafter, the trigger generator instructions 470 instruct the trigger generator 102 to receive the emulated legacy game data 109 from the emulator at 476. Once the emulated legacy game data 109 is received, the trigger generator 102 is instructed to identify a trigger 351 that corresponds to the trigger event 350 at 477. Finally, at 478 the trigger generator 102 is instructed to deliver the trigger 351 to the emulator 107.

Figure 4B:
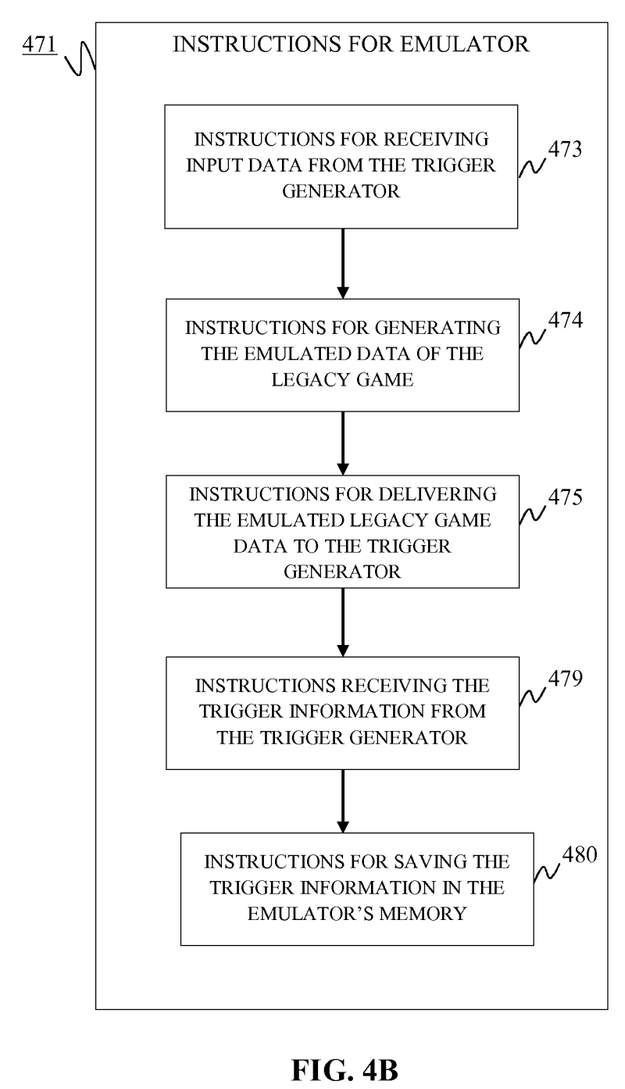
FIG. 4B is a block diagram describing the instructions for how an emulator is able to receive a trigger to be used in an emulation routine according to an aspect of the present disclosure.

As shown in FIG. 4B, a set of emulator instructions 471 may be implemented, e.g., by the emulator 107. The emulation instructions 471 may be formed on a nontransitory computer readable medium such as the memory 132' or the mass storage device 134'. The emulator instructions 471 may also be part of the process control program 133'. The instructions include receiving the game input data 347 from the trigger generator 102 at 473. Thereafter the emulator 107 is instructed to begin emulating the selected legacy game 106 in order to produce emulated legacy game data 109 at 474. This emulated legacy game data 109 is then delivered to the trigger generator 102 at 475. The emulator 107 is then instructed to receive the a trigger 351 from that corresponds to the trigger event 350 from the trigger generator 102 at 479. Finally, at 480 the emulator 107 is instructed to save the trigger 351 into the emulator's memory.

According to additional aspects of the present disclosure, the trigger may be a haptic trigger. A haptic trigger is a portion of legacy game data that has been identified as corresponding to a haptic game event. As used herein, a haptic game event is an event in the legacy game that warrants a haptic response. There are many different types of legacy game data that can correspond to an event warranting a haptic response. By way of example, and not by way of limitation, legacy game data arising from the generation of certain sounds, such as an explosion that occurs during the game, may be identified as a haptic trigger. The emulator may determine that an explosion has occurred in the legacy game by identifying the portion of the legacy game data which will generate the sound of an explosion from the sound card. However, it should be noted that haptic triggers are not limited to sound events.

Alternatively a haptic trigger may also be identified when a specified combination of conditions are met. By way example and not by way of limitation, a specified combination of conditions may be when, in a football game, there are only a few seconds remaining in the game and a user is trying to kick a game winning field goal. A haptic response, such as shaking the controller, may enable the user to feel the pressure of the situation in the game and produce a more realistic gaming experience. The emulator may use screen scraping to find the time left on the clock, and the emulator can detect that the legacy game is accessing the play for kicking a field goal. Further, haptic triggers may be any other event or combination of events that may be perceived by the emulator, and which do not require changing the internal code of the legacy game. By way of example and without limitation these events may be sound card events, reading information from the disk, writing data to a memory card, or monitoring the memory contents of a legacy game while the legacy game is being emulated.

According to additional aspects of the present disclosure a replay of a mini-game may be made with only a thin input channel. Starting from a snapshot, a script could be written to only record the video and button presses that comprise the game inputs from a person playing the game. Therefore, the replay may be made by simply starting from the original snapshot and playing back the recorded game inputs. This replay method is possible with a deterministic emulator because the emulator will always go through the same sequence of operations when the same game inputs are provided to the emulator.

According to additional aspects of the present disclosure an emulated game may be pre-loaded in order to make the game begin as soon as a user initiates the game. Game players may access the games over a cloud. A server that hosts the titles may create a pre-build buffer so that the server is ready to go as soon as the user clicks "play".

For example, a game may be loaded when a cursor is hovering over a certain game selection on a startup screen. The cloud system could base the decision to load the game on a prediction engine. The prediction engine may predict demand and initiate a sufficient number of host machines to meet the demand. The predictions may be based on what pages users are hovering over or historical data for the demand load for a given game title, e.g., certain game titles may historically have a big demand when school gets out.

For resuming from snapshots, the saved translated code, e.g., from the cache can be used to make the resume run faster. If this cannot be done, the code can be just-in-time (JIT) compiled. Some of this code may use information that is platform dependent. However, in such cases the platform-dependent information can be generated from platform-independent information in the snapshot data. For example, certain host-specific addresses need to be converted. For security, addresses are randomized when a new process starts. These addresses are platform-dependent, but the platform specific addresses could be generated by the host from the platform-independent snapshot data.

According to additional aspects of the present disclosure adaptive load balancing of software emulation of a hardware GPU may be implemented. Normally the rasterization of each line would be assigned to a different thread. However, each line could have a different number of pixels. The emulator doesn't always know how many pixels are needed for each scan line of the screen. So it's difficult to load balance the emulation of the rasterization. To overcome this, the GPU software emulation uses tile-based rasterization. In this type of rasterization small tiles of the screen can be rasterized as opposed to the entire screen. A thread can be assigned to the rasterization of each tile. Tile-based rasterization is efficient for threading because it allows for prediction of how many pixels need to be processed. The emulator can set how many pixels are in each tile and that makes it much easier to load balance since it is known a priori how many pixels are in each tile. It is easier to load balance the rasterization of the tiles than to load balance the lines.

According to additional aspects of the present disclosure in a cloud-based emulation of legacy games it is desirable to run threads independently while reducing latency because the games are going to be served over the cloud. It is desirable to reduce latency within each instance of a game and to reduce latencies when there are multiple instances of the same game on a given server. One source of latency is due to the fact the emulation of the GPU is not currently synchronized with emulation of everything else. Buffering a lot of commands before GPU starts can produce 15 to 30 ms of latency. In order to fix this, the emulator may save time by running things in parallel. For example, the emulator may run GPU emulation in parallel with the CPU emulator. Nominal GPU latency variance may be 20-30 ms. There is also an encoder latency, which has to start about 6 ms after GPU. However, 20 ms of latency may be saved by actually delaying the start of the GPU until after the CPU has processed the first few sets of frames. Certain types of CPU (e.g., the EE on the PS2) may finish the processing of these frames in 10-12 ms. By buffering the CPU output and waiting until it is done before sending the output to the GPU the GPU can be provide with a lot of work that can be run in parallel with the CPU's processing of the next group of frames.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. In an emulator computing device configured to operate on a network, a method for adding a trigger for a trigger event in an emulation routine for a video game, the method comprising:
   a) receiving a set of one or more game inputs in the emulator computing device, wherein the game inputs are configured to advance a video game from a first state to a second state;
   b) emulating the video game, wherein the emulator emulates a CPU and GPU, wherein a CPU output of one or more frames is buffered before GPU emulation begins, and wherein emulating the video game produces a set of emulated game data;
   c) delivering the emulated game data to a trigger generator;
   d) receiving a trigger from the trigger generator; and
   e) storing the trigger in the emulation routine, wherein when an emulator runs the emulation routine, the emulator compares resulting emulated game data to the trigger stored in the emulation routine, and produces a desired output when the resulting emulated game data matches the trigger.

2. The method of claim 1, wherein the trigger is derived from a difference between the first state and the second state of the emulated game data.

3. The method of claim 1, wherein the trigger is a sound card event in the emulated game data.

4. The method of claim 1, wherein the trigger is derived from screen scraped data included in the emulated game data.

5. The method of claim 1, wherein the trigger is derived from a score included in the emulated game data.

6. The method of claim 1, wherein the trigger is a change in a memory value corresponding to a trigger event in the video game.

7. The method of claim 1, wherein the trigger is a haptic trigger.

8. The method of claim 1, wherein the trigger is derived from a time value included in the emulated game data.

9. The method of claim 1, wherein the trigger is derived from a health value included in the emulated game data.

10. The method of claim 1, wherein the emulator computing device contains the trigger generator.

11. The method of claim 1, wherein the trigger generator includes a central processor unit.

12. The method of claim 1, wherein the trigger generator is contained in a trigger generator computing device connected to the emulator computing device over the network, wherein said delivering the emulated game data and said receiving the trigger from the trigger generator are performed through the network.

13. The method of claim 12, wherein the game inputs are received from the trigger generator.

14. The method of claim 1, wherein the trigger is configured to identify a piece of data that corresponds to a trigger event occurring in the video game, and wherein the trigger is configured to produce an additional output not generated by original code of the video game upon occurrence of the trigger event.

15. The method of claim 14, further comprising:
   f) emulating the video game based on the emulation routine having the stored trigger; and
   g) producing the additional output when emulated game data matches the trigger.

16. A nontransitory computer readable medium containing program instructions for adding a trigger for a trigger event in an emulation routine for a video game, and wherein execution of the program instructions by one or more processors of a computer system causes the one or more processors to carry out the steps of:
   a) receiving a set of one or more game inputs, wherein the game inputs are configured to advance a video game from a first state to a second state;
   b) emulating the video game, wherein the emulator emulates a CPU and GPU, wherein a CPU output of one or more frames is buffered before GPU emulation begins, and wherein emulating the video game produces a set of emulated game data;
   c) delivering the emulated game data to a trigger generator;
   d) receiving a trigger from the trigger generator; and
   e) storing the trigger in the emulation routine, wherein when an emulator runs the emulation routine, the emulator compares resulting emulated game data to the trigger stored in the emulation routine, and produces a desired output when the resulting emulated game data matches the trigger.

17. An emulator configured to operate on a network, comprising:
   a processor;
   a memory coupled to the processor;
   one or more instructions embodied in memory for execution by the processor, the instructions being configured to implement a method for adding a trigger for a trigger event in an emulation routine for a video game, the method comprising:
   a) receiving a set of one or more game inputs, wherein the game inputs are configured to advance a video game from a first state to a second state;
   b) emulating the video game, wherein the emulator emulates a CPU and GPU, wherein a CPU output of one or more frames is buffered before GPU emulation begins, and wherein emulating the video game produces a set of emulated game data;
   c) delivering the emulated game data to a trigger generator;
   d) receiving a trigger from the trigger generator; and
   e) storing the trigger in the emulation routine, wherein when an emulator runs the emulation routine, the emulator compares resulting emulated game data to the trigger stored in the emulation routine, and produces a desired output when the resulting emulated game data matches the trigger.

* * * * *